(12) United States Patent
Hakura et al.

(10) Patent No.: US 8,941,676 B2
(45) Date of Patent: Jan. 27, 2015

(54) ON-CHIP ANTI-ALIAS RESOLVE IN A CACHE TILING ARCHITECTURE

(71) Applicant: NVIDIA Corporation, Santa Clara, CA (US)

(72) Inventors: Ziyad S. Hakura, Gilroy, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/927,026

(22) Filed: Jun. 25, 2013

(65) Prior Publication Data

US 2014/0118352 A1 May 1, 2014

Related U.S. Application Data

(60) Provisional application No. 61/719,271, filed on Oct. 26, 2012.

(51) Int. Cl.
| | |
|---|---|
| *G09G 5/36* | (2006.01) |
| *G06T 15/00* | (2011.01) |
| *G06T 15/40* | (2011.01) |
| *G06F 9/38* | (2006.01) |
| *G06T 1/20* | (2006.01) |
| *G06T 1/60* | (2006.01) |
| *G09G 5/395* | (2006.01) |
| *G09G 5/00* | (2006.01) |
| *G06T 15/50* | (2011.01) |
| *G06F 12/08* | (2006.01) |
| *G06F 9/44* | (2006.01) |

(52) U.S. Cl.
CPC ............ *G06T 15/005* (2013.01); *G06T 15/405* (2013.01); *G06F 9/38* (2013.01); *G06T 1/20* (2013.01); *G06T 1/60* (2013.01); *G09G 5/395* (2013.01); *G09G 5/003* (2013.01); *G06T 15/503* (2013.01); *G06F 12/0808* (2013.01); *G06F 9/44* (2013.01)
USPC .......................................................... 345/557

(58) Field of Classification Search
CPC .................. G09G 2360/121; G09G 2360/122; G09G 5/393; G06F 12/0802; G06F 12/0808
USPC .................................................. 345/611, 557
See application file for complete search history.

(56) References Cited

U.S. PATENT DOCUMENTS

| | | | | |
|---|---|---|---|---|
| 5,818,456 | A | * | 10/1998 | Cosman et al. ................ 345/614 |
| 6,091,422 | A | * | 7/2000 | Ouaknine et al. ............. 345/419 |
| 6,323,860 | B1 | | 11/2001 | Zhu et al. |
| 6,535,209 | B1 | | 3/2003 | Abdalla et al. |
| 6,697,063 | B1 | | 2/2004 | Zhu et al. |
| 7,170,515 | B1 | | 1/2007 | Zhu et al. |
| 7,612,783 | B2 | * | 11/2009 | Koduri et al. ................. 345/611 |
| 8,082,426 | B2 | * | 12/2011 | Paltashev et al. ............. 712/228 |
| 2006/0188163 | A1 | * | 8/2006 | Elder ............................ 382/232 |

\* cited by examiner

*Primary Examiner* — Hau Nguyen
(74) *Attorney, Agent, or Firm* — Patterson & Sheridan, LLP

(57) ABSTRACT

One embodiment of the present invention includes a graphics subsystem for processing multi-sample anti-aliasing work. The graphics subsystem includes a cache unit, a tiling unit, and a screen-space pipeline coupled to the cache unit and to the tiling unit. The tiling unit is configured to organize multi-sample anti-aliasing commands into cache tile batches. The screen-space pipeline includes a pixel shader and a raster operations unit, and receives cache tile batches from the tiling unit. The pixel shader is configured to generate sample data based on a set of primitives and to generate resolved data based on the sample data. The raster operations unit is configured to store the sample data in the cache unit and to invalidate the sample data after the pixel shader generates the resolved data.

20 Claims, 12 Drawing Sheets

ON-CHIP ANTI-ALIAS RESOLVE IN A CACHE TILING ARCHITECTURE

CROSS-REFERENCE TO RELATED APPLICATIONS

This application claims benefit of U.S. provisional patent application Ser. No. 61/719,271, filed Oct. 26, 2012 and titled "An Approach for Tiled Caching." The subject matter of this related application is hereby incorporated herein by reference.

BACKGROUND OF THE INVENTION

1. Field of the Invention

Embodiments of the present invention relate generally to three-dimensional (3D) graphics processing, and, more specifically, to on-chip anti-alias resolve in a cache tiling architecture.

2. Description of the Related Art

Many graphics processing tasks generate intermediate data, which is data that is generated and used during the execution of a graphics processing task, but is not the final data output for the graphics processing task. One type of graphics processing task that generates intermediate data is multi-sample anti-aliasing, which is a particular type of anti-aliasing technique in which multiple color samples are generated for each screen pixel. The multiple color samples associated with each screen pixel are then resolved to generate a blended color value for each screen pixel. In multi-sample anti-aliasing, the multiple samples are deemed intermediate data because the samples are not the final output of the graphics processing task; rather, the blended color values for the screen pixels constitute the final output.

Some graphics subsystems implement a tiling architecture in which a render target is subdivided into cache tiles. Work received by such a graphics subsystem is rearranged such that the work is processed in cache tile order. In other words, work associated with a first cache is processed first, then work associated with a second cache tile is processed, then work associated with a third cache tile, and so forth. In some implementations, data associated with cache tiles is maintained in an on-chip cache memory while the cache tile is being processed, which reduces the amount of traffic between the on-chip cache and the frame buffer. This approach in turn reduces memory bandwidth utilization and associated power consumption. Also, in some implementations, the architecture includes multiple processing entities that operate in concert to process each cache tile. Each processing entity is assigned a portion of each cache tile and performs processing operations associated with that portion.

Several challenges exist with respect to performing anti-aliasing in an architecture that implements cache tiling and includes multiple processing entities. For example, the multiple processing entities need to be configured to manage data dependencies that are associated with the multi-sample anti-aliasing operation. Although these data dependencies exist in a graphics subsystem with only one processing entity, performing multi-sample anti-aliasing with multiple processing entities that cooperate to render each cache tile complicates the steps that need to be taken to manage these data dependencies, because data dependencies may exist across processing entities.

Another challenging aspect of processing multi-sample anti-aliasing operations in a graphics subsystem that includes multiple processing entities that implement a cache tiling architecture is managing data flow between the cache memory that stores the cache tiles and an external memory such as a frame buffer. As described above, intermediate data, such as the sample data is only needed during the multi-sample anti-aliasing operation, and is not the final output of such operation. Such intermediate data need not be written out from the cache memory to the frame buffer. Writing such intermediate data out to the frame buffer would unnecessarily consume memory bandwidth and power.

As the foregoing illustrates, what is needed in the art are techniques for managing intermediate data associated with anti-aliasing, while also managing data dependencies between the operations in the anti-aliasing task.

SUMMARY OF THE INVENTION

One embodiment of the present invention sets forth a graphics subsystem for processing multi-sample anti-aliasing work. The graphics subsystem includes a cache unit and a screen-space pipeline coupled to the cache unit. The screen-space pipeline includes a pixel shader and a raster operations unit. The pixel shader is configured to generate sample data based on a set of primitives and to generate resolved data based on the sample data. The raster operations unit is configured to store the sample data in the cache unit and to invalidate the sample data after the pixel shader generates the resolved data.

One embodiment of the present invention sets forth a computing device for processing multi-sample anti-aliasing work. The computing device includes a graphics subsystem. The graphics subsystem includes a cache unit and a screen-space pipeline coupled to the cache unit. The screen-space pipeline includes a pixel shader and a raster operations unit. The pixel shader is configured to generate sample data based on a set of primitives and to generate resolved data based on the sample data. The raster operations unit is configured to store the sample data in the cache unit and to invalidate the sample data after the pixel shader generates the resolved data.

One embodiment of the present invention sets forth a method for processing multi-sample anti-aliasing work. The method includes generating a first set of sample data based on a first set of primitives. The method also includes generating a first set of resolved data based on the first set of sample data. The method also includes storing the first set of sample data in a first set of cache lines. The method also includes invalidating the first set of cache lines after the first set of resolved data is generated.

One advantage of the disclosed technique is that data dependencies between sample data and resolved data are honored. Another advantage is that the sample data that is generated is not written out to the frame buffer, thus reducing memory bandwidth consumption.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
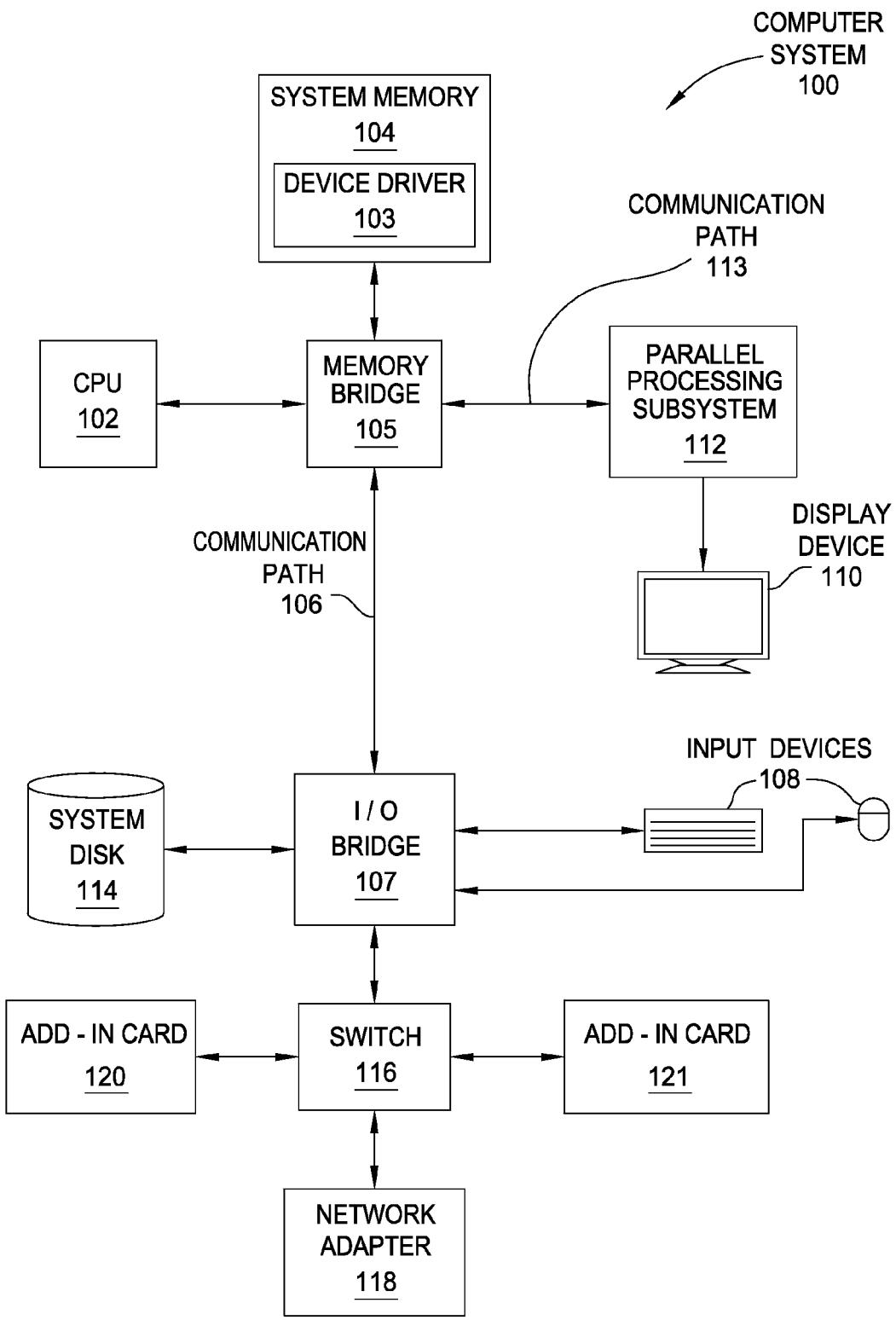
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
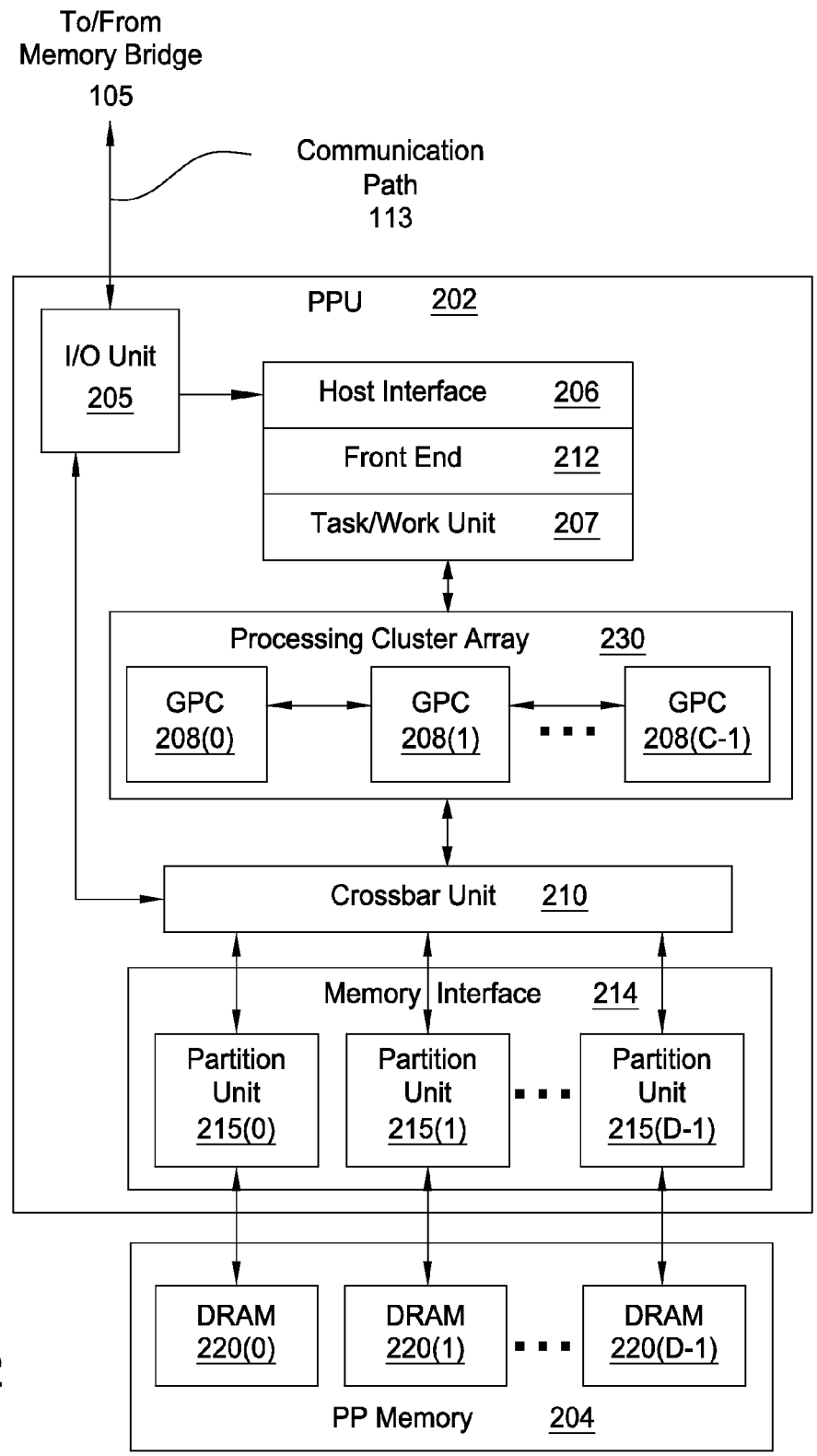
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
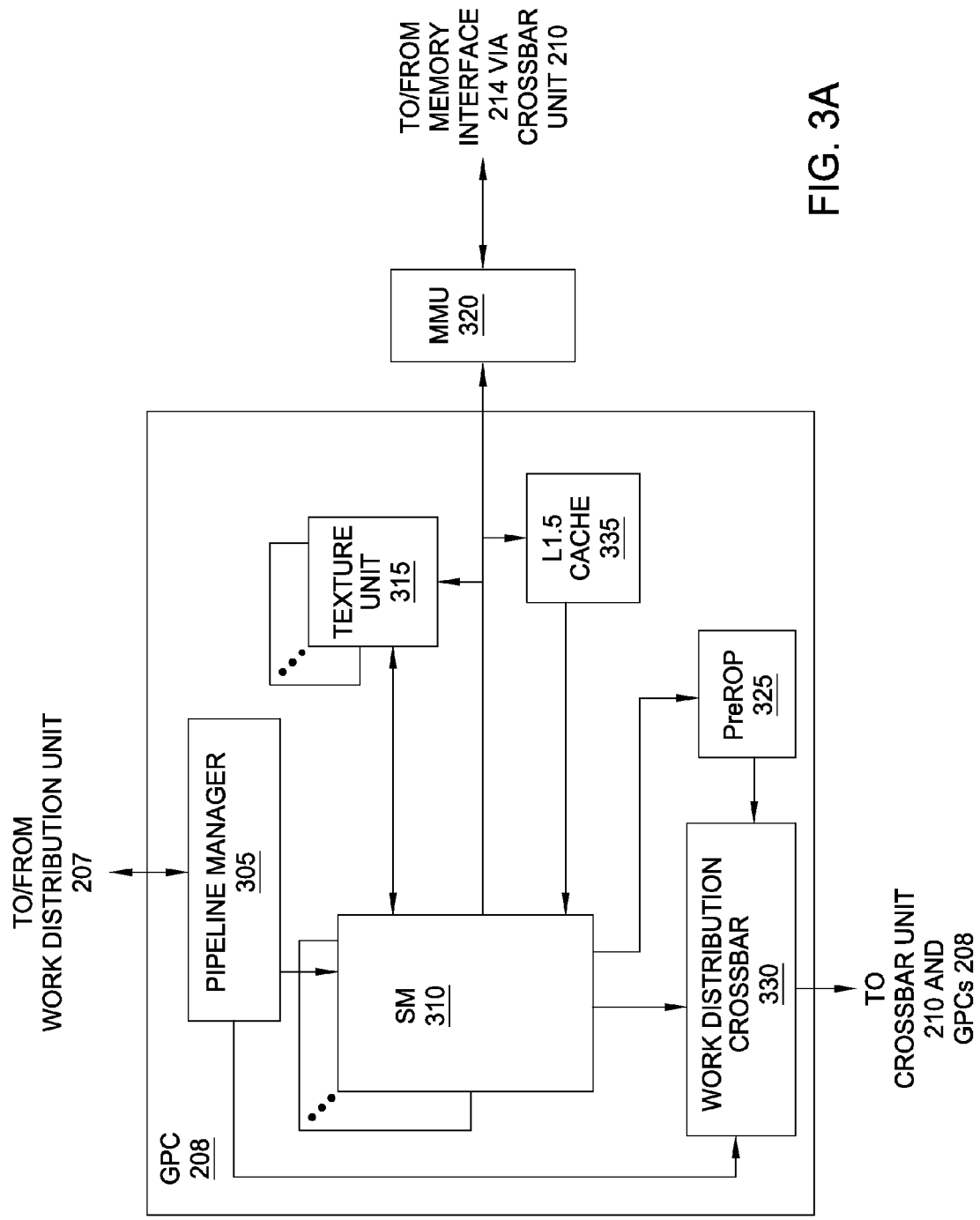
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
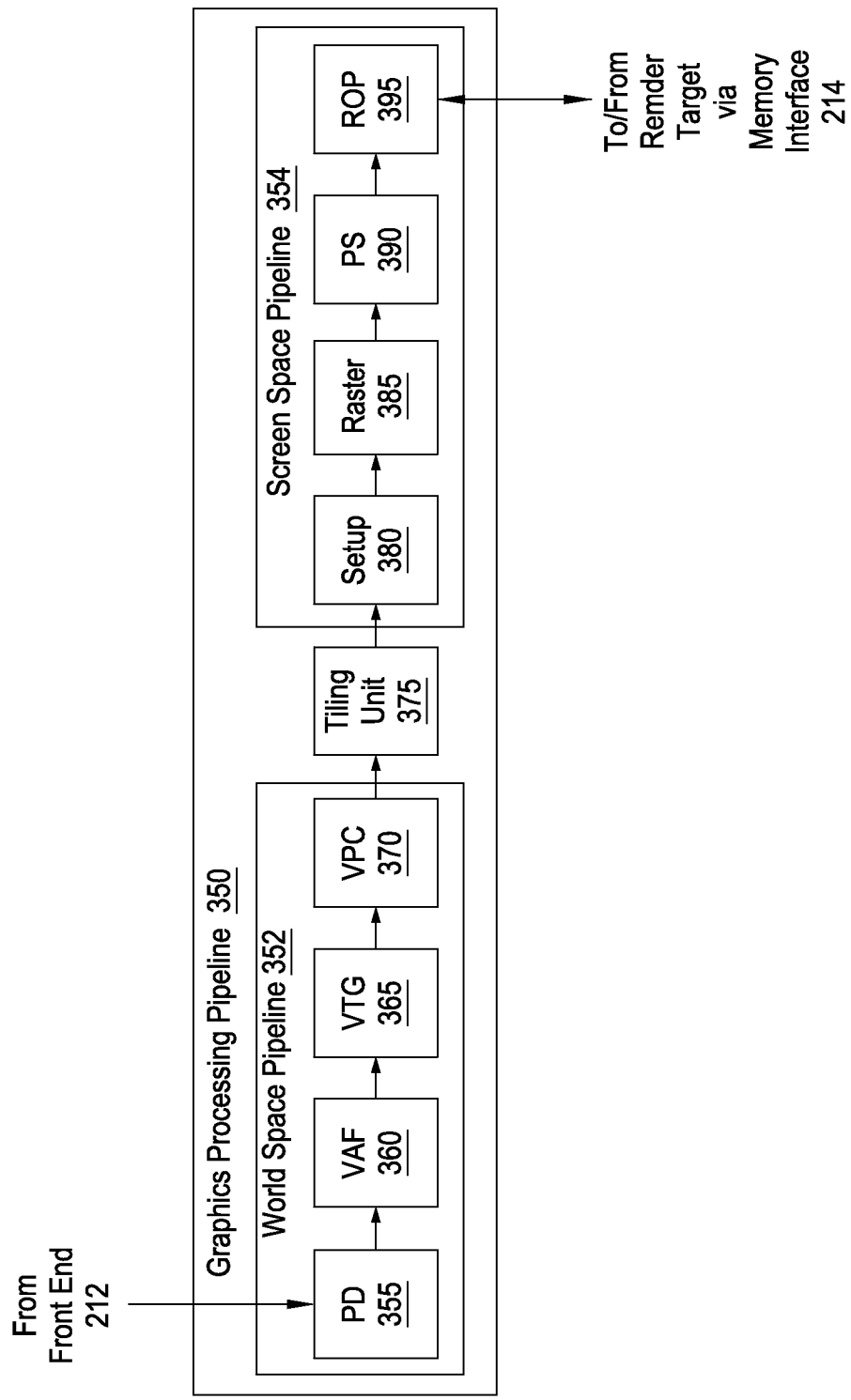
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, the color values, surface normal vectors, and transparency values at each vertex of the graphics primitive. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112.

In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
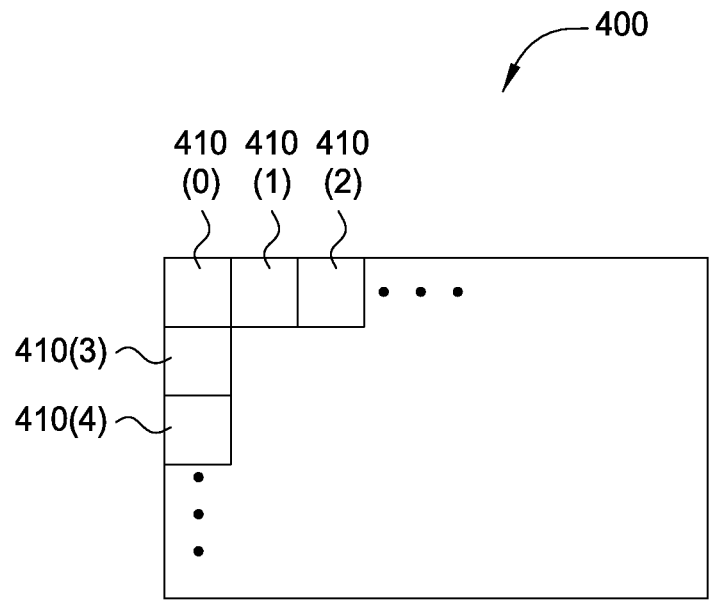
FIG. 4 is a conceptual diagram of a cache tile that the graphics processing pipeline of FIG. 3B may be configured to generate and process, according to one embodiment of the present invention.
Figure 4:
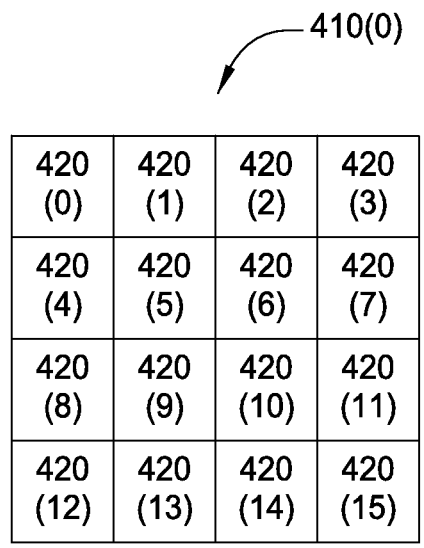

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Multi-Sample Anti-Aliasing in a Cache Tiling Architecture

FIGS. 5-9 describe techniques for performing multi-sample anti-aliasing in a highly parallel graphics subsystem that implements a cache tiling architecture. Anti-aliasing is a technique oftentimes implemented in graphics pipelines to reduce the abruptness of sharp transitions of color in images typically found at the edges of shapes. Initially, a sample surface including a certain number of samples per pixel is generated, based on input commands such as commands to render three-dimensional shapes. An anti-alias filter is applied to the sample surface to resolve the samples into final color values for individual pixels. With multi-sample anti-aliasing, the initially generated sample surface includes multiple samples per pixel. As a general matter, increasing the number of samples per pixel when performing multi-sample anti-aliasing results in higher quality final image.

Graphics pipelines typically process data in a pipelined manner, meaning that certain operations such as pixel shading are performed on one batch of data while other operations such as rasterization are performed on another batch of data. Additionally, some graphics subsystems, such as the graphics pipeline 350 depicted in FIG. 3B implement a tiling architecture in which a render target is subdivided into cache tiles. Work received by such a graphics subsystem is rearranged such that the work is processed in cache tile order. Data associated with cache tiles is maintained in an on-chip cache memory while the cache tile is being processed, which reduces the amount of traffic between the on-chip cache and a frame buffer. Some graphics subsystems that implement a tiling architecture include multiple processing entities that operate in concert to process each cache tile. Each processing entity is assigned a portion of each cache tile and performs processing operations associated with that portion.

One challenging aspect of the architecture described above is that pipelining introduces data dependencies associated with anti-aliasing operations, because the operation for generating the final color values is dependent on the results of the operation for generating the sample surface. These data dependencies are complicated by the inclusion of multiple processing entities. An additional challenging aspect of processing multi-sample anti-aliasing operations in a graphics subsystem that includes multiple processing entities that implement a cache tiling architecture is managing data flow between the cache memory that stores the cache tiles and an external memory such as a frame buffer. As described above, intermediate data, such as the sample data is only needed during the multi-sample anti-aliasing task, and is not the final output of such task. Such intermediate data need not be written out from the cache memory to the frame buffer, and writing such intermediate data out to the frame buffer would unnecessarily consume memory bandwidth and power.

The techniques described below include mechanisms for managing data dependencies associated with multi-sample anti-aliasing and for managing data flow to and from a cache memory in a highly parallel graphics architecture that implements cache tiling.

Figure 5:
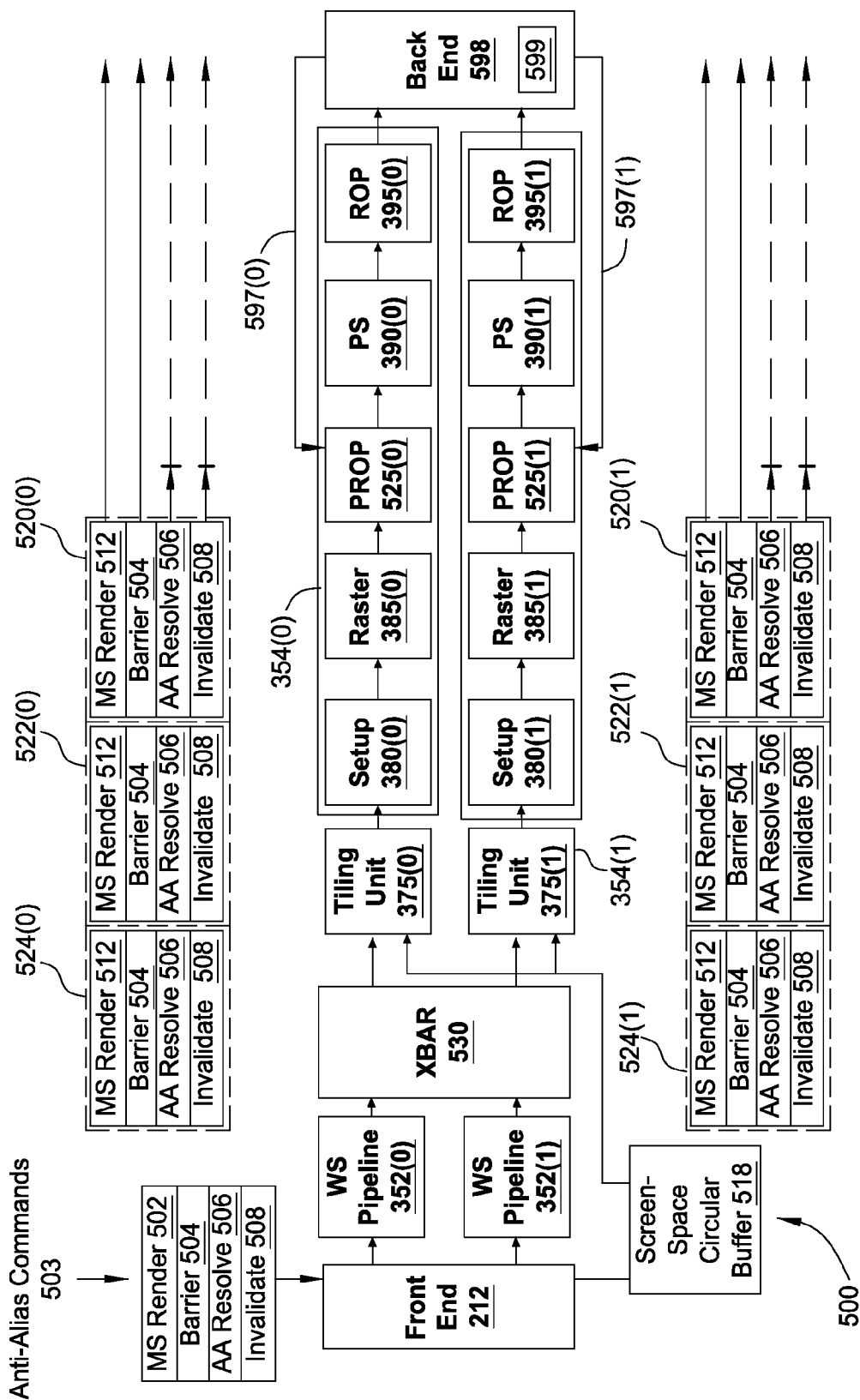
FIG. 5 illustrates a graphics subsystem configured to implement tile-based anti-aliasing functionality, according to one embodiment of the present invention.

FIG. 5 illustrates a graphics subsystem 500 configured to implement tile-based multi-sample anti-aliasing functionality, according to one embodiment of the present invention. As shown, the graphics subsystem 500 includes a front end unit 212, a first world-space pipeline 352(0), a second world-space pipeline 352(1), a crossbar unit 530 ("XBAR"), a first tiling unit 375(0), a second tiling unit 375(1), a first screen-space pipeline 354(0), a second screen-space pipeline 354(1), and a back end unit 598.

The graphics subsystem 500 includes at least two instances of the screen-space pipeline 354 and the world-space pipeline 352, for increased performance. Although depicted in FIG. 5 with two instances of the world-space pipeline 352 and the screen-space pipeline 354, the teachings provided herein apply to graphics pipelines having any number of world-space pipelines 352 and screen-space pipelines 354.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0) and the second world-space pipeline 352(1) may be implemented in a second GPC 208(1). As a general matter, each screen-space pipeline 352 may be implemented in a different GPC 208, and in a similar fashion, each world-space pipeline 354 may be implemented in a different GPC 208. Further, a given GPC 208 can implement a world-space pipeline 354 and also a screen-space pipeline 352. For example, the first GPC 208(0) may implement both the first world-space pipeline 352(0) and the first screen-space pipeline 354(0).

The front end unit 212 receives commands from a device driver 103 and schedules tasks for processing by the world-space pipeline 352. In one embodiment, the front end unit 212 distributes tasks to the first world-space pipeline 352(0) and the second world-space pipeline 352(1) in round-robin order. The front end unit 212 also transmits barrier commands to the screen-space circular buffer 518 for use by the tiling units 375 as described below. The screen-space circular buffer 518 is a memory construct that may be stored in a cache such as an L2 cache.

The first world-space pipeline 352(0) and the second world-space pipeline 352(1) function in a similar manner as described above with respect to FIGS. 1-4. In other words, the first world-space pipeline 352(0) and the second world-space pipeline 352(1) generate primitives in response to the work received from the front end unit 212.

The first world-space pipeline 352(0) and second world-space pipeline 352(1) each include a bounding box generator unit (not shown) that determines to which screen space pipeline—the first screen-space pipeline 354(0) or the second screen-space pipeline 354(1)—each primitive should be transmitted. Both the first world-space pipeline 352(0) and the second world-space pipeline 352(1) may send primitives to either or both of the first screen-space pipeline 354(0) or the second screen-space pipeline 354(1).

Each tiling unit 375 is associated with a respective screen-space pipeline 354. Each tiling unit 375 thus receives primitives from the crossbar 530 destined to the corresponding screen-space pipeline 354 and transmits those primitives to the corresponding screen-space pipeline 354. For example, the first tiling unit 375(0) receives primitives destined for the first screen-space pipeline 354(0) and transmits the primitives to the first screen-space pipeline 354(0).

Each of the units in the screen-space pipeline (i.e., setup 380, rasterizer 385, pixel shader 390, and ROP 395) functions in a similar manner as described above with respect to FIGS. 1-4. The pre-raster operations unit ("PROP") 525, not depicted in FIG. 3B, is a unit that is configured to perform, among other things, early z-testing, optimizations for color blending, and address translations.

A back-end unit 598 receives data from the screen-space pipeline 354 and provides feedback through feedback pathway 597 to PROP 525. The back-end unit 598 includes a barrier command counter 599 for counting the number of tiled barrier commands received by the back-end unit 598. The functionality of the back-end unit 598 may be implemented in the front end unit 212, in which case the graphics subsystem 500 would include only the front end unit 212.

Operation of the graphics subsystem 500 is now described in the context of anti-alias commands 503 transmitted from a device driver 103. In operation, the device driver 103 transmits anti-alias commands 503 to the front end unit 212. The anti-alias commands 503 include commands configured to cause the graphics subsystem 500 to generate a multi-sample anti-aliased image. The anti-alias commands 503 include a batch of multi-sample render commands 502, a tiled barrier command 504, an anti-alias resolve command 506, and a cache invalidate command 508.

The front end unit 212 distributes tasks associated with the batch of multi-sample render commands 502, with the anti-alias resolve command 506, and with the cache invalidate command 508 to the first world-space pipeline 352(0) and the second world-space pipeline 352(1). The front end unit 212 also causes the barrier command 504 to be transmitted to a screen-space circular buffer 518 for subsequent access by the first tiling unit 375(0) and the second tiling unit 375(1) as discussed below. The first world-space pipeline 352(0) and the second world-space pipeline 352(1) process these tasks to generate primitives for processing by the first screen-space pipeline 354(0) and the second screen-space pipeline 354(1).

Each tiling unit 375 receives a batch of primitives 512 that are associated with the batch of multi-sample render commands 502. When the tiling unit 375 receives the last primitive included in the batch of primitives 512, the screen-space circular buffer 518 transmits the barrier command 504 to the tiling unit 375. After this, the tiling 375 unit receives the anti-alias resolve command 506 and the cache invalidate command 508.

Each tiling unit 375 tiles all of the work in the tiling unit 375. In other words, when the tiling unit 375 receives the primitives and commands associated with the anti-alias commands 503, the tiling unit 375 generates cache tile batches that include the primitives and commands associated with the anti-alias commands 503. Each cache tile batch is associated with a different cache tile 410 and includes primitives that overlap a particular cache tile. Each cache tile batch also includes the tiled barrier command 504, the anti-alias resolve command 506 and the cache invalidate command 508. Each tiling unit 375 transmits each cache tile batch to the screen-space pipeline 354 associated with the tiling unit 375.

The batch of primitives 512 proceeds through the screen-space pipeline 354. Units in the screen-space pipeline 354 process the batch of primitives 512 and generate a multi-sample surface that includes multiple samples per pixel.

The barrier command 504 proceeds through the screen-space pipeline 354 after the batch of primitives 512. When the PROP unit 525 receives the barrier command 504, the PROP unit 525 sets a barrier flag corresponding to the cache tile associated with the cache tile batch that includes the barrier command 504. This barrier flag causes work received after the barrier command 504 to not proceed past the PROP unit 525 until after the barrier flag is cleared.

The anti-alias resolve command 506 flows down the pipeline following the barrier command 504. The anti-alias resolve command 506 is configured to cause the screen-space pipeline 354 to apply an anti-alias filter to the sample surface to generate final pixel values. More specifically, the anti-alias resolve command 506 is configured to cause the pixel shader 390 to access the multi-sample surface and to apply a filter to the sample data in the multi-sample surface to generate final color data. The barrier flag set in the PROP unit 525 causes the anti-alias resolve command 506, which arrives at PROP 525 after the barrier command 504, to halt at the PROP unit 525 until the barrier flag is reset.

The invalidate command 508 flows down the pipeline following the anti-alias resolve command 506. The invalidate command 508 is configured to cause a cache to invalidate cache entries associated with the multi-sample surface, in order to prevent those entries from being written out to the frame buffer. The cache entries that are invalidated store data associated with the multi-sample surface, such as color data, z data, and the like. Because the invalidate command 508 is received by the PROP unit 525 after the anti-alias resolve command 506, the invalidate command 508 is also halted by the PROP unit 525.

The screen-space pipeline completes processing the batch of primitives 512 when the pixel shader 390 and raster operation unit 395 have completed corresponding operations. As stated above, the barrier command 504 follows this work. When the barrier command 504 reaches the back-end unit 598, the back-end unit 598 increments a barrier command counter 599 to indicate that the back-end unit 598 has received a barrier command 504 from one of the screen-space pipelines 354.

If the barrier command counter 599 indicates that a barrier command 504 has been received from less than all of the screen-space pipelines 354, then the back-end unit 598 does not transmit a barrier release signal through feedback pathway 597 to either PROP unit 593, and both the first PROP unit 525(0) and the second PROP unit 525(1) continue to prohibit work received after the barrier command 504 from being processed or from proceeding past the first PROP unit 525(0) or the second PROP unit 525(1).

If the barrier command counter 599 indicates that a barrier command 504 has been received from each of the screen-space pipelines 354, then the back-end unit 598 transmits a barrier release signal through feedback pathway 597, which causes both first PROP unit 525(0) and second PROP unit 525(1) to reset corresponding barrier flags. Resetting the barrier flags causes both first PROP 525(0) and second PROP 525(1) to begin processing work received after the barrier command 504, including the anti-alias resolve command 506 and the invalidate command 508. Because the batch of primitives 512 has completed processing in the pixel shader 390 and in ROP 395, sample data is available for the anti-alias filter, and thus the anti-alias resolve command 506 can proceed.

In FIG. 5, several cache tile batches are illustrated. A first cache tile batch 520(0) is associated with a first cache tile 410, a second cache tile batch 522(0) is associated with a second cache tile 410, and a third cache tile batch 524(0) is associated with a third cache tile 410. The first cache tile batch 520(0), the second cache tile batch 522(0), and the third cache tile batch 524(0) are each generated by the first tiling unit 375(0). Similarly, a first cache tile batch 520(1) is associated with the first cache tile 410, a second cache tile batch 522(1) is associated with the second cache tile 410, and a third cache tile batch 524(1) is associated with the third cache tile 410. The first cache tile batch 520(1), the second cache tile batch 522(1), and the third cache tile batch 524(1) are each generated by the second tiling unit 375(1). Each cache tile batch includes the batch of primitives 512, the barrier command 504, the anti-alias resolve command 506, and the invalidate command 508.

As is shown, work associated with the anti-alias resolve command 506 for any particular cache tile cannot proceed past PROP 525 until all of the work associated with rendering the sample surface has completed processing in both the first ROP 395(0) and the second ROP 395(1). Preventing work associated with the anti-alias resolve command 506 from proceeding past PROP 525 until all work associated with rendering the sample surface has completed allows the samples in the sample surface to be generated and available before the anti-alias resolve command 506 begins processing.

A barrier command is not needed between the anti-alias resolve command 506 and the cache invalidate command 508 because commands in a cache tile batch are processed in application programming interface (API) order. This means that the cache invalidate command 508, which is processed by ROP 395 will not be processed until after operations associated with the anti-alias resolve command 506 in both the pixel shader 390 and ROP 395 are completed.

Figure 6:
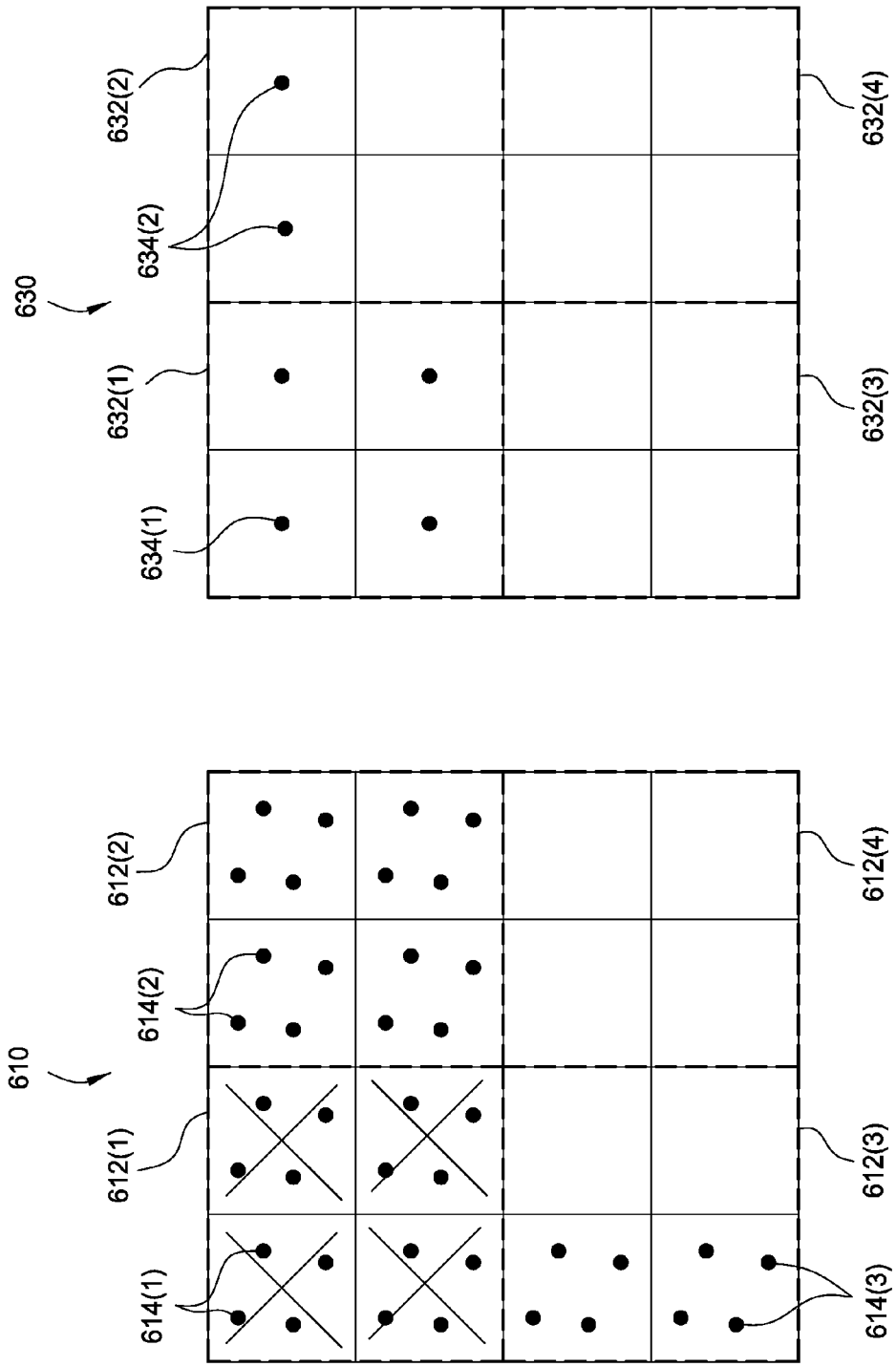
FIG. 6 illustrates an example of resolving multi-sample data into color data for a plurality of pixels, according to one embodiment of the present invention.

FIG. 6 illustrates an example of resolving multi-sample data into color data for a plurality of pixels, according to one embodiment of the present invention. A sample surface 610 and a final surface 630 are depicted. As shown, the sample surface 610 includes a first sample cache tile 612(1), a second sample cache tile 612(2), a third sample cache tile 612(3), and a fourth sample cache tile 612(4). The final surface 630 includes a first final cache tile 632(1) that corresponds to the first sample cache tile 612(1), a second final cache tile 632(2) that corresponds to the second sample cache tile 612(2), a third final cache tile 632(3) that corresponds to the third sample cache tile 612(3), and a fourth final cache tile 632(4) that corresponds to the fourth sample cache tile 612(4).

The first sample cache tile 612(1) includes samples 614(1) that have been already rendered by a pixel shader 390, and invalidated by ROP 395 (indicated by the "X" symbol). The second sample cache tile 612(2) includes samples 612(2) that have been already rendered by the pixel shader 390, but that have not been invalidated yet. The third sample cache tile 612(3) also includes samples 614(3) that have been rendered but not yet invalidated. The fourth sample cache tile 612(4) includes no rendered samples.

The first final cache tile 632(1) includes pixels 634(1) that have been rendered. Pixels 634(1) in the first final cache tile 632(1) have been rendered because the samples 614(1) in the first sample cache tile 612(1) have already been rendered and invalidated. The second final cache tile 632(2) includes some pixels 634(2) that have been rendered, but also includes some pixels that have not been rendered. Since the samples in the second sample cache tile 612(2) have just recently been rendered, the pixels in the second final cache tile 632(2) have just started to be rendered.

The third final cache tile 632(3) includes no rendered pixels because the entire third sample cache tile 612(3) has not yet been rendered, and thus a release signal has not yet been generated. Finally, the fourth final cache tile 632(4) includes no rendered pixels because no samples have been rendered for the fourth sample cache tile 612(4) yet.

The techniques described above with respect to FIGS. 5 and 6 are sufficient when the anti-alias filter only accepts as input samples from within the pixel for which the filter operation is being applied. However, when the anti-alias filter accepts samples from more than one pixel as input, then the device driver 103 transmits additional commands to the graphics subsystem 500 in order to cause sample data to be available for the filter for each of the cache tiles. Because the anti-alias filter accepts samples from more than one pixel as input, the anti-alias resolve command accepts as input sample data from both within the cache tile, as well as from a border of pixels that surrounds the cache tile. This sample data must therefore be available to the anti-alias resolve command upon execution so that the anti-alias filter may blend sample data across cache tile boundaries.

All of the commands for executing an anti-alias operation with a multi-pixel filter are tiled by the tiling unit, meaning that the tiling unit 375 generates cache tile batches that each include the above-mentioned commands. The commands transmitted by the device driver 103 include the following: a command to translate the scissor rectangle in a forward direction with respect to the traversal line 718 (that is, towards cache tiles that are to be traversed in the future), a command to render the sample surface, a tiled barrier command, a command to translate the scissor rectangle back to the default position (that is, to the position associated with the cache tile by default), a command to resolve the sample surface, a command to translate the scissor rectangle in a rearward direction with respect to the traversal line 718 (that is, towards cache tiles that have already been traversed), and a tiled cache invalidate command.

Figure 7A:
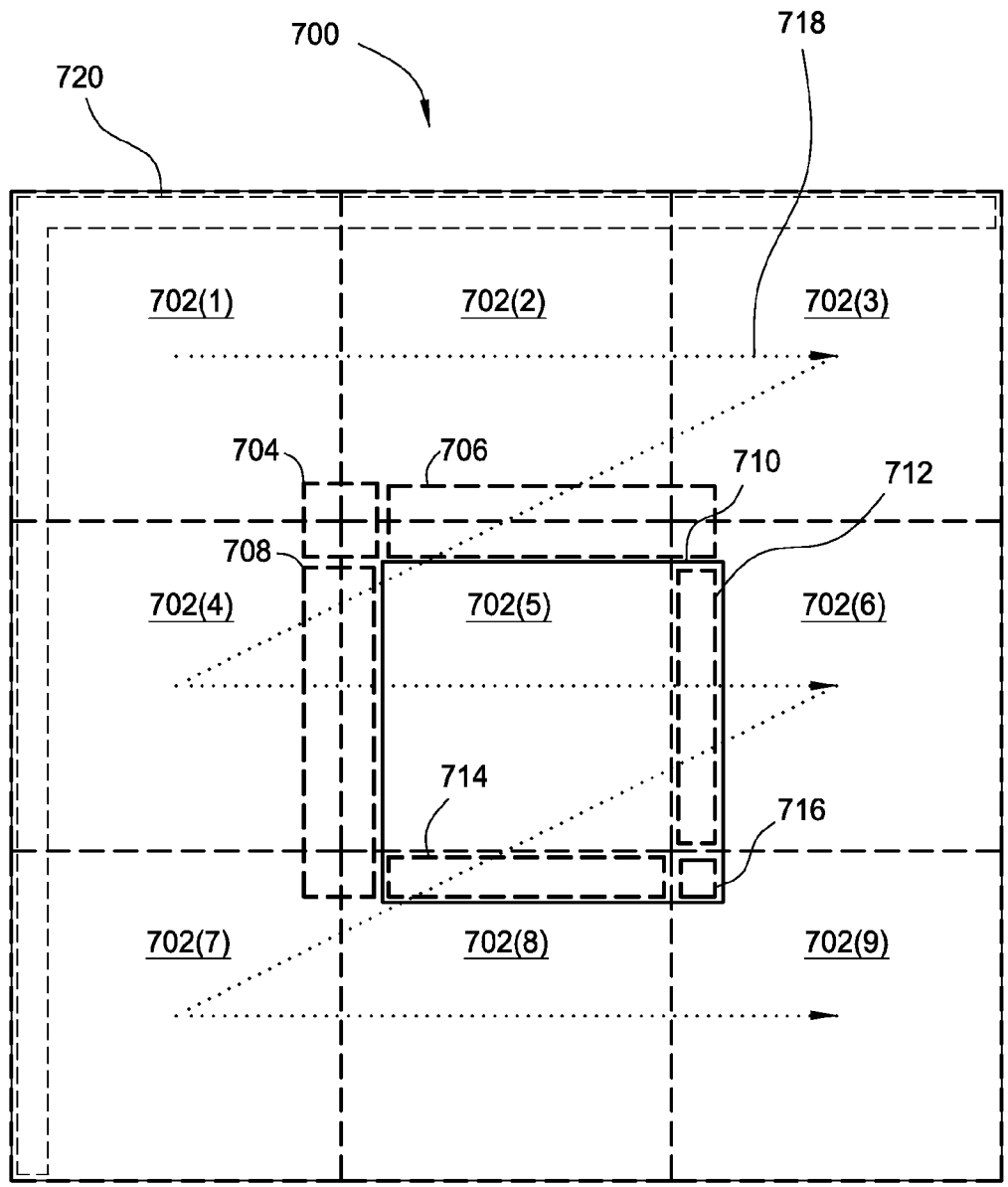
FIG. 7A illustrates the results of operations configured to generate multi-sample data, according to one embodiment of the present invention.
Figure 7B:
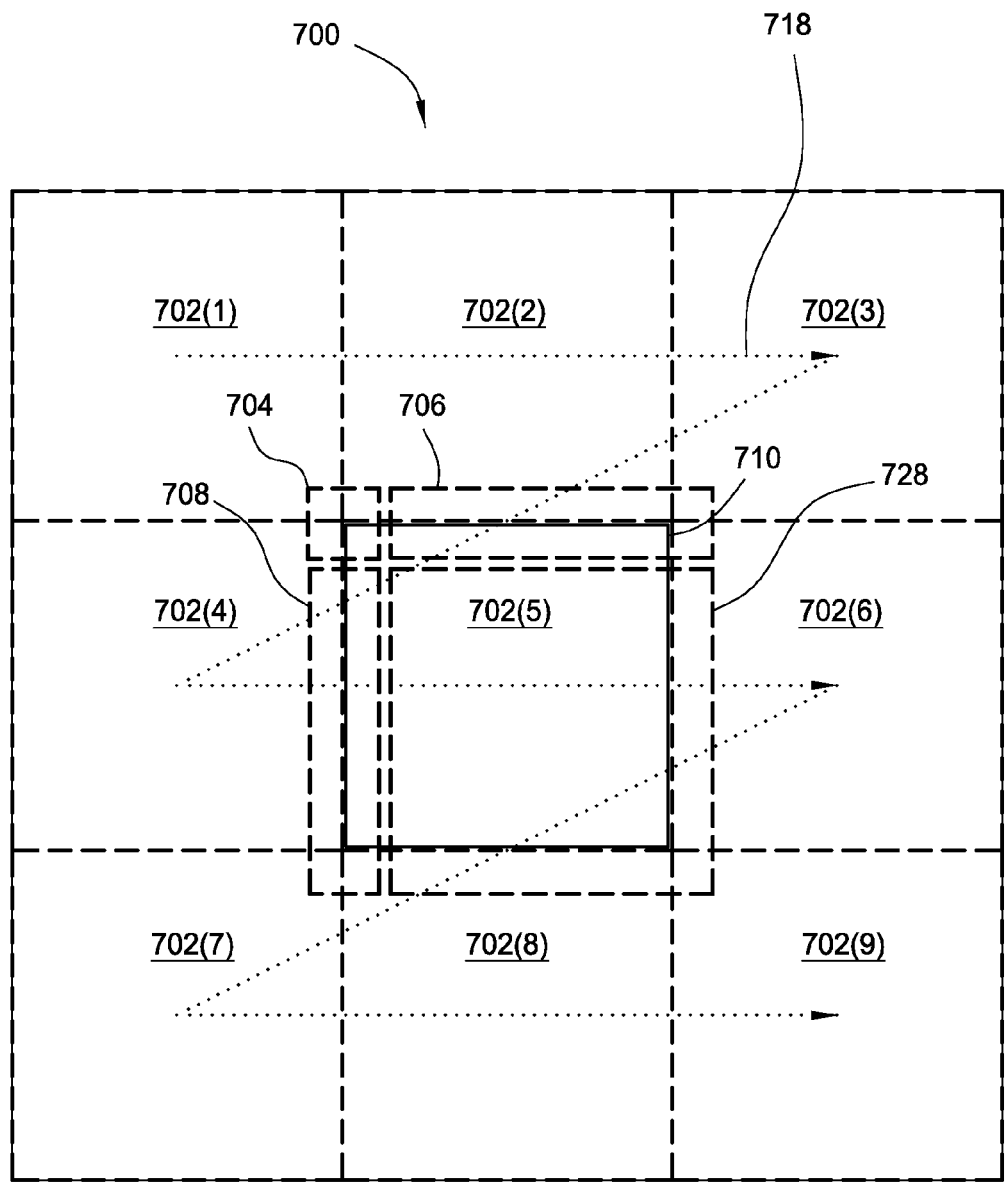
FIG. 7B illustrates the results of operations configured to resolve the multi-sample data, according to one embodiment of the present invention.
Figure 7C:
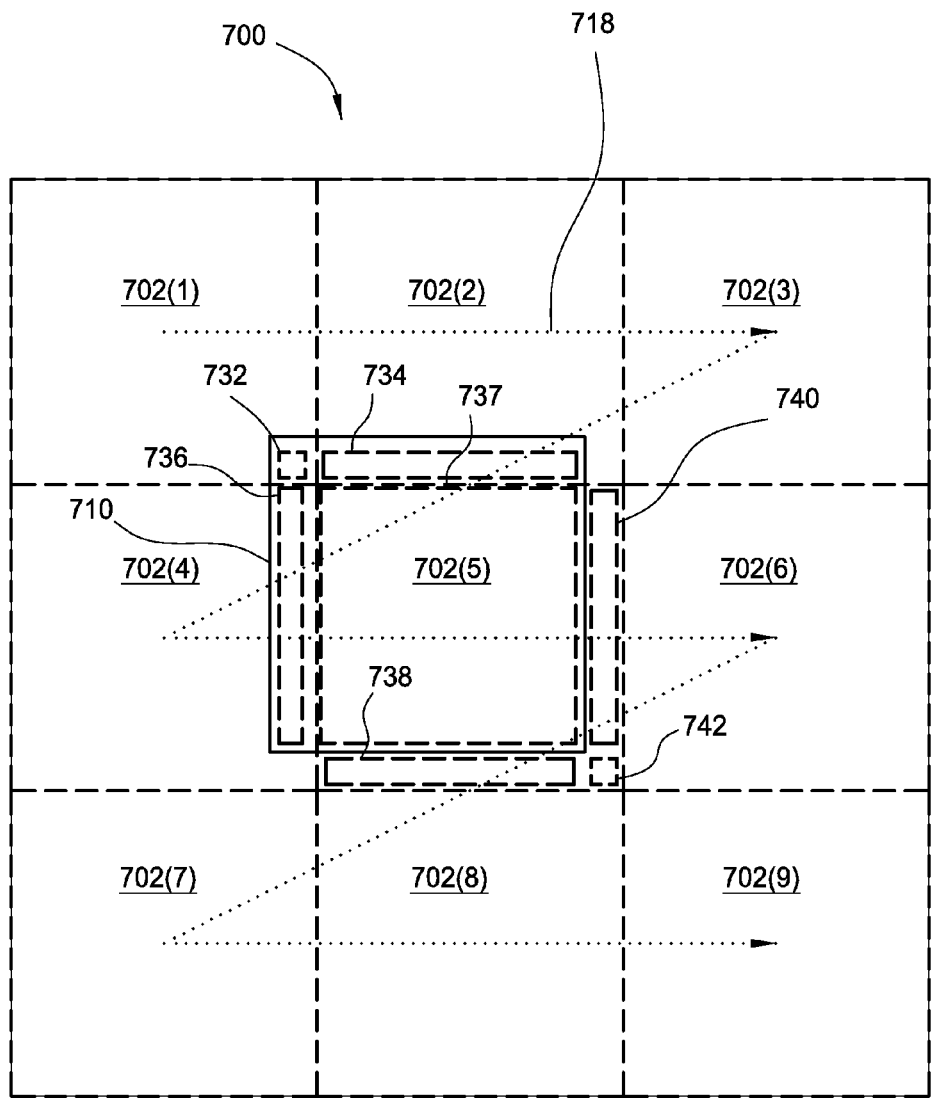
FIG. 7C illustrates the results of operations configured to invalidate cache entries associated with the multi-sample data, according to one embodiment of the present invention.

FIGS. 7A-7C depict three different stages of rendering for a central cache tile 702(5) in response to receiving these commands. FIG. 7A depicts generating sample data for the central cache tile 702(5). FIG. 7B depicts resolving the sample data to generate final pixel values for the central cache tile 702(5). FIG. 7C depicts invalidating cache entries associated with the sample data for the central cache tile 702(5). Tile traversal line 718 depicts a direction of cache tile traversal, which indicates the order in which the cache tiles are processed by a graphics subsystem 500.

As described above, each cache tile is associated with a portion of a render target 700. Processing for any particular cache tile occurs for the portion of the render target associated with the cache tile. However, work associated with a cache tile may be configured to act on a portion of a render target that is offset with respect to the area of the render target normally associated with the cache tile. A modifiable scissor rectangle specifies whether and to what extent any work being processed by the pipeline is translated.

FIG. 7A illustrates the results of operations configured to generate multi-sample data for the central cache tile 702(5), according to one embodiment of the present invention. The scissor rectangle 710 indicates that the sample data is generated for most of cache tile 702(5), as well as for portions of cache tile 702(6), cache tile 702(8), and cache tile 702(9). The sample data is not generated for a first portion 704, a second portion 706, or a third portion 708 because sample data for those portions have already been generated. More specifically, because the scissor rectangle is translated forward for each cache tile, portion 704 is generated when cache tile 702(1) is traversed, portion 706 is generated when cache tile 702(2) is traversed, and portion 708 is generated when cache tile 702(4) is traversed. In an analogous manner, translating the scissor rectangle 710 forward while processing the central cache tile 702(5) causes sample data for portion 712 in cache tile 702(6), portion 714 in cache tile 702(8), and portion 716 in cache tile 702(9) to be generated. Thus, sample data is available when those cache tiles process respective resolve steps.

Because the scissor rectangle 710 is translated forward for generating multi-sample data for each cache tile, a sample data for border portion 720 is not generated during processing of any of the cache tiles. Therefore, sample data for border portion 720 is generated prior to beginning traversal of cache tiles along tile traversal line 718. This generation of sample data for border portion 720 can be done with one of several techniques. In one such technique, a cache tile is defined that occupies the space defined by border portion 720. The sample data is generated for this cache tile prior to beginning traversal of cache tiles along traversal line 718.

FIG. 7B illustrates the results of operations configured to resolve the sample data to generate a final image for the central cache tile 702(5), according to one embodiment of the present invention. Sample data for each of portion 704, portion 706, and portion 708 are generated during the traversal of previous cache tiles. Portion 728 is generated during the operation referred to with respect to FIG. 7A. Because all of these portions have already been generated, sample data within central cache tile 702(5), as well as sample data extending outside of cache tile 702(5) into a border region is available for the anti-alias filter. The resolve step can therefore provide final pixel values for the entire cache tile 702(5).

FIG. 7C illustrates the results of operations configured to invalidate cache entries associated with the sample data for the central cache tile 702(5), according to one embodiment of the present invention. Sample data in portion 732, portion 734, portion 736, and 737 is invalidated. These portions of sample data are no longer needed because cache tiles 702(1)-702(4) have already been processed per the tile traversal line 718. Therefore, the cache lines associated with that data can be invalidated, which prevents that data from being written out from the cache, thereby saving memory bandwidth and reducing power consumption. Portion 740, portion 738, and portion 742 are not invalidated because these portions are needed by cache tiles 702(6)-702(9).

Figure 8:
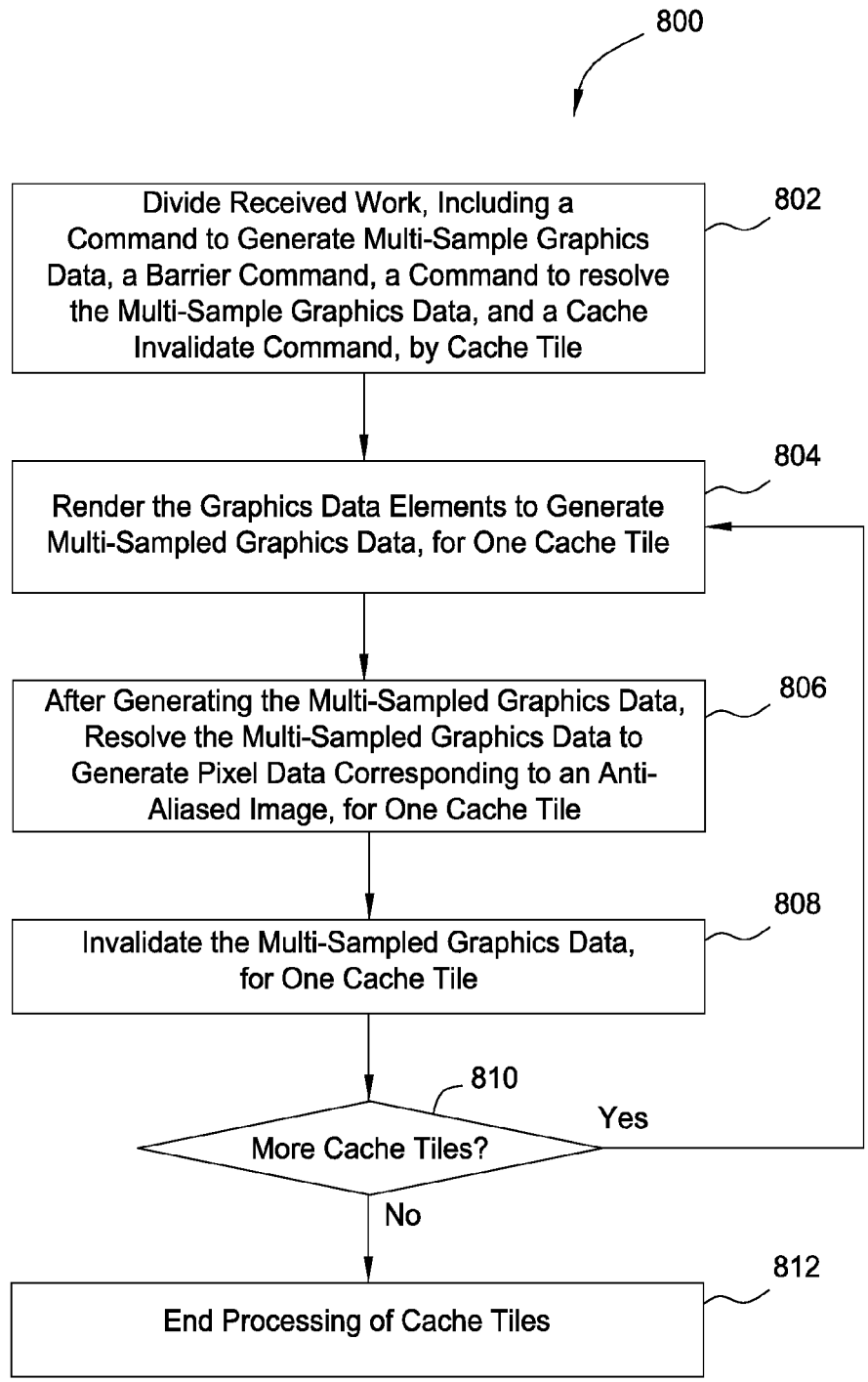
FIG. 8 is a flow diagram of method steps for performing a resolve operation, according to one embodiment of the present invention.

FIG. 8 is a flow diagram of method steps for performing a resolve operation, according to one embodiment of the present invention. Although the method steps are described in conjunction with the systems of FIGS. 1-6, persons skilled in the art will understand that any system configured to perform the method steps, in any order, falls within the scope of the present invention.

As shown, a method 800 begins at step 802, where a tiling unit 375 receives work from a world-space pipeline 352 and divides the work up by cache tile. Each cache tile includes a command to generate sample data, a barrier command, a command to resolve the sample data, and a cache invalidate command. In step 804, the pixel shader 390 and ROP 395 generate sample data for a cache tile. In step 806, after generating the sample graphics data, the pixel shader 390 resolves the sample data for a cache tile to generate final pixel values. In step 808, after generating the final pixel values, the ROP unit 395 invalidates the sample data for a cache tile. In step 810, the tiling unit determines whether there are more cache tiles to process. If there are more cache tiles, then the method 800 returns to step 804. If there are no more cache tiles, then the method 800 proceeds to step 812, where the tiling unit 375 finishes processing cache tiles. At this point, the tiling unit 375 may accumulate primitives until the tiling unit 375 decides to perform another flush operation.

Figure 9:
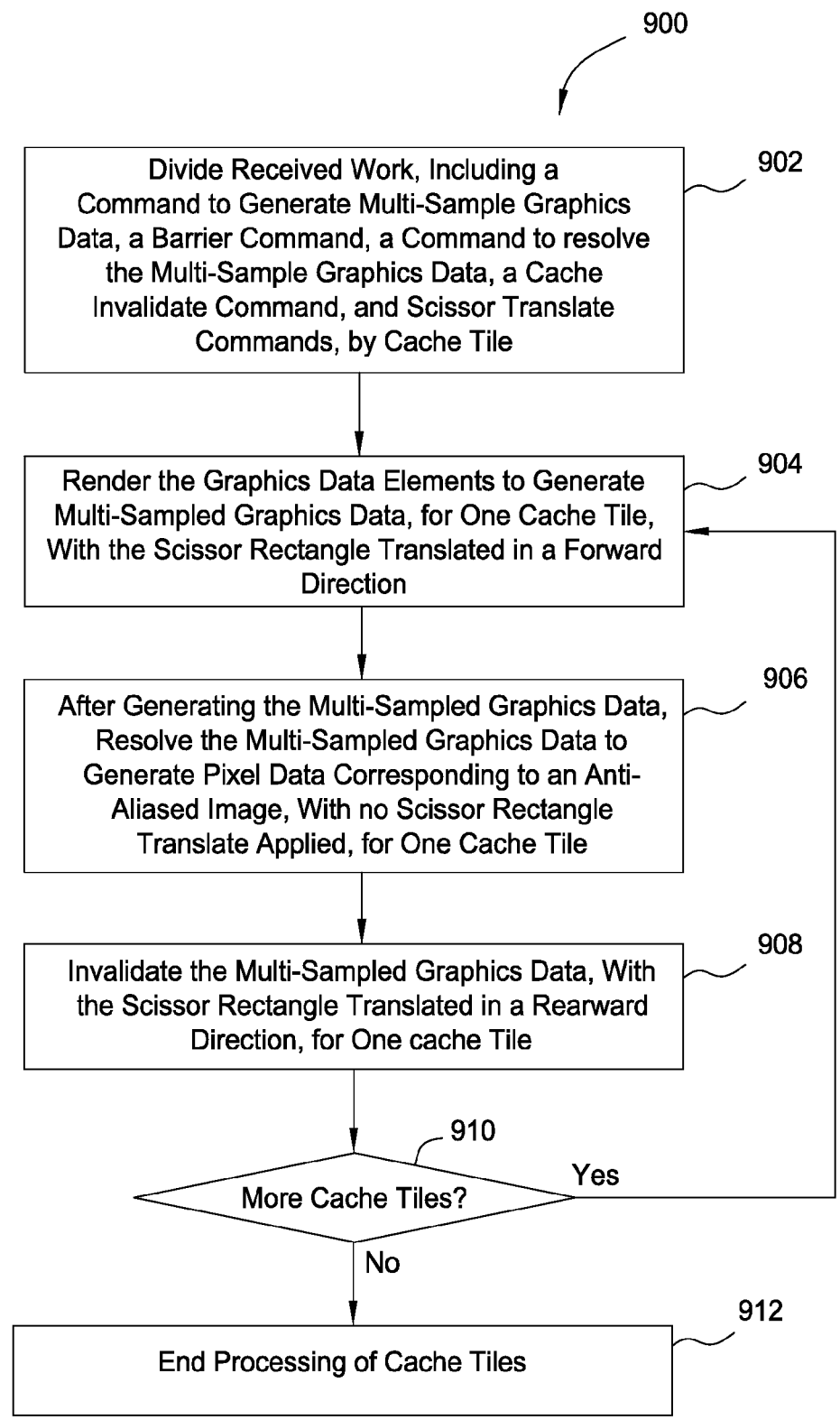
FIG. 9 is a flow diagram of method steps for performing a resolve operation, according to another embodiment of the present invention.

FIG. 9 is a flow diagram of method steps for performing a resolve operation, according to another embodiment of the present invention. Although the method steps are described in conjunction with the systems of FIGS. 1-7C, persons skilled in the art will understand that any system configured to perform the method steps, in any order, falls within the scope of the present invention.

As shown, a method 900 begins at step 902, where a tiling unit 375 receives work from a world-space pipeline 352 and divides the work up by cache tile. The work for each cache tile includes a command to generate sample data, a barrier command, a command to resolve the sample data, a cache invalidate command, and commands to translate a scissor rectangle. In step 904, the pixel shader 390 and ROP 395 generate sample data for a cache tile, with the scissor rectangle translated in a forward direction. In step 906, after generating the sample data, the pixel shader 390 resolves the sample data for a cache tile to generate final pixel data, with no scissor rectangle translate applied. In step 908, after generating the anti-aliased image, the ROP unit 395 invalidates the sample data for a cache tile, with the scissor rectangle translated in a rearward direction. In step 910, the tiling unit determines whether there are more cache tiles to process. If there are more cache tiles, then the method 900 returns to step 904. If there are no more cache tiles, then the method 900 proceeds to step 912, where the tiling unit 375 finishes processing cache tiles. At this point, the tiling unit 375 may accumulate primitives until the tiling unit 375 decides to perform another flush operation.

In sum, a graphics pipeline that includes a tiling unit receives a batch of primitives for rendering a sample surface from a world-space section of the graphics pipeline. The tiling unit generates cache tile batches, each associated with different cache tiles, and transmits the cache tile batches to a screen-space section of the graphics pipeline that includes a raster operations unit. The raster operations unit processes the primitives in each cache tile batch, to generate samples for each cache tile.

A tiled barrier command included in the cache tile batches is configured to cause a pre-raster operations unit to allow commands associated with generating sample data to proceed past the pre-raster operations unit. The tiled barrier command is also configured to cause the pre-raster operations unit to prevent commands received after the barrier command from proceeding past the pre-raster operations unit until a raster operations unit has generated samples sample surface. Once the samples for the sample surface is generated, the pre-raster operations unit allows the commands associated with resolving the sample surface to continue down the pipeline. After the sample data has resolved and the final pixel values have been generated, the graphics pipeline invalidates cache data associated with the sampled surface.

For multi-sample anti-aliasing in which resolving the sampled surface involves considering sample data corresponding to more than one screen pixel, the tiling unit also includes scissor rectangle translate commands in the cache tile batches. The scissor rectangle translate commands cause the area of a render target on which the raster operations unit operates to shift by an amount specified by the scissor rectangle. Prior to generating samples for the sample surface, the raster operations unit translates the cache tile scissor rectangle in a forward direction with respect to the direction of cache tile traversal.

This operation causes the raster operations unit to generate multi-sample data for portions of the multi-sampled image corresponding to several pixels within future cache tiles, providing a cushion of pixel data for the resolve step for those future cache tiles. Prior to resolving the multi-sampled image, the raster operations unit translates the cache tile scissor to the original position of the cache tile scissor. This translate operation allows the portion of the multi-sample data associated with the cache tile to be generated by the resolve operation. Finally, prior to invalidating the cache entries associated with the multi-sample image, the raster operations unit translates the cache tile scissor in a rearward direction with respect to the direction of cache tile traversal. This operation causes the invalidation operation to invalidate data associated with several pixels from already-traversed cache tiles, which are no longer needed, but to not invalidate the cushion of pixels needed for resolve the multi-sample data associated with future cache tiles.

One advantage of the disclosed technique is that data dependencies between generating sample data and resolving the sample data are honored. Another advantage is that the sample data that is generated is not written out to the frame buffer, thus reducing memory bandwidth consumption. Another advantage is that the disclosed techniques provide mechanisms for managing data dependencies and for reducing memory bandwidth consumption in graphics subsystem architecture that implements cache tiling and that includes multiple processing entities.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What we claim is:

1. A graphics subsystem, comprising:
a cache unit; and
a first screen-space pipeline coupled to the cache unit and including:
a first pixel shader configured to:
generate a first set of sample data based on a first set of primitives, and
generate a first set of resolved data based on the first set of sample data; and
a first raster operations unit configured to:
store the first set of sample data in a first set of cache lines included in the cache unit, and
invalidate the first set of cache lines in response to the first set of resolved data being generated.

2. The graphics subsystem of claim 1, wherein:
the first screen-space pipeline further comprises:
a first pre-raster-operations unit configured to:
receive a first barrier command,
in response to receiving the first barrier command, suspend processing so that the first pixel shader is prevented from generating the first set of resolved data, and
in response to receiving a release signal, reinstate processing so that the first pixel shader is able to generate the first set of resolved data.

3. The graphics subsystem of claim 2, further comprising:
a second screen-space pipeline coupled to the cache unit and including:
a second pixel shader configured to:
generate a second set of sample data based on a second set of primitives, and
generate a second set of resolved data based on the second set of sample data;
a second raster operations unit configured to:
store the second set of sample data in a second set of cache lines included in the cache unit, and
invalidate the second set of cache lines after the second set of resolved data is generated; and
a second pre-raster-operations unit configured to:
receive a second barrier command,
in response to receiving the second barrier command, suspend processing so that the second pixel shader is prevented from generating the second set of resolved data, and
in response to receiving the release signal, reinstate processing so that the second pixel shader is able to generate the second set of resolved data.

4. The graphics subsystem of claim 3, further comprising a back-end unit configured to transmit the release signal to the first pre-raster-operations unit and the second pre-raster-operations unit after the first raster operations unit stores the first set of sample data in the first set of cache lines and the second raster operations unit stores the second set of sample data in the second set of cache lines.

5. The graphics subsystem of claim 4, wherein the back-end unit is configured to transmit the release signal in response to receiving the first barrier command from the first screen-space pipeline and the second barrier command from the second screen-space pipeline.

6. The graphics subsystem of claim 3, wherein the first set of sample data is associated with a first cache tile, the first set of resolved data is associated with the first cache tile, the second set of sample data is associated with the first cache tile, and the second set of resolved data is associated with the first cache tile.

7. The graphics subsystem of claim 3, wherein:
the first pixel shader is configured to:
generate the first set of sample data for a first set of raster tiles that correspond to a first subset of the first cache tile, and
generate the first set of resolved data for the first set of raster tiles; and
the second pixel shader is configured to:
generate the second set of sample data for a second set of raster tiles that correspond to a second subset of the first cache tile, and
generate the second set of resolved data for the second set of raster tiles.

8. The graphics subsystem of claim 6, wherein the first pixel shader is configured to apply a multi-pixel filter to the first set of primitives to generate the first set of resolved data.

9. A graphics subsystem, comprising:
a cache unit;
a first screen-space pipeline coupled to the cache unit and including:
a first pixel shader configured to:
generate a first set of sample data associated with a first cache tile that is associated with a first set of pixels, based on a first set of primitives, wherein the first set of sample data is generated based on a second set of pixels that are offset from the first set of pixels based on a cache tile traversal direction, and
apply a multi-pixel filter to the first set of primitives to generate a first set of resolved data for the first set of pixels and associated with the first cache tile;
a first raster operations unit configured to:
store the first set of sample data in a first set of cache lines included in the cache unit, and
invalidate the first set of cache lines after the first set of resolved data is generated, wherein the first set of cache lines corresponds to a third set of pixels that are offset from the first set of pixels based on a direction opposite to the cache tile traversal direction;
a first pre-raster-operation unit configured to:
receive a first barrier command,
in response to receiving the first barrier command, suspend processing so that the first pixel shader is prevented from generating the first set of resolved data, and
in response to receiving a release signal, reinstate processing so that the first pixel shader is able to generate the first set of resolved data; and
a second screen-space pipeline coupled to the cache unit and including:
a second pixel shader configured to:
generate a second set of sample data associated with the first cache tile based on a second set of primitives, and
generate a second set of resolved data associated with the first cache tile based on the second set of sample data;
a second raster operations unit configured to:
store the second set of sample data in a second set of cache lines included in the cache unit, and
invalidate the second set of cache lines after the second set of resolved data is generated; and a second pre-raster-operations unit configured to:
receive a second barrier command,
in response to receiving the second barrier command, suspend processing so that the second pixel shader is prevented from generating the second set of resolved data, and
in response to receiving the release signal, reinstate processing so that the second pixel shader is able to generate the second set of resolved data.

10. The graphics subsystem of claim 9, wherein:
the first pixel shader is configured to translate a scissor rectangle to a first rectangle location that corresponds to the second set of pixels prior to generating the first set of sample data,
the first pixel shader is configured to translate the scissor rectangle to a second rectangle location that corresponds to the first set of pixels prior to generating the first set of resolved data, and
the first raster operations unit is configured to translate the scissor rectangle to a third rectangle location that corresponds to the third set of pixels prior to invalidating the first set of cache lines.

11. The graphics subsystem of claim 9, wherein:
the first pixel shader is further configured to:
generate a third set of sample data based on a third set of primitives, and
generate a third set of resolved data based on the third set of sample data,
the first raster operations unit is further configured to:
store the third set of sample data in a third set of cache lines included in the cache unit, and
invalidate the third set of cache lines after the third set of resolved data is generated, and
the third set of sample data is associated with a third cache tile that is related to a third set of pixels located proximate to a border of a render target.

12. The graphics subsystem of claim 1, wherein the first raster operations unit is configured to transmit a first set of invalidate commands to the cache unit that is configured to cause the cache unit to modify a first set of valid bits associated with the first set of cache lines to indicate that data stored in the first set of cache lines is invalid.

13. A computing device, comprising:
a graphics subsystem, comprising:
a cache unit; and
a first screen-space pipeline coupled to the cache unit and including:
a first pixel shader configured to:
generate a first set of sample data based on a first set of primitives, and
generate a first set of resolved data based on the first set of sample data; and
a first raster operations unit configured to:
store the first set of sample data in a first set of cache lines included in the cache unit, and
invalidate the first set of cache lines in response to the first set of resolved data being generated.

14. The computing device of claim 13, wherein:
the first screen-space pipeline further comprises:
a first pre-raster-operations unit configured to:
receive a first barrier command,
in response to receiving the first barrier command, suspend processing so that the first pixel shader is prevented from generating the first set of resolved data, and
in response to receiving a release signal, reinstate processing so that the first pixel shader is able to generate the first set of resolved data;
and further comprising:
a back-end unit configured to transmit the release signal to the first pre-raster-operations unit after the first raster operations unit stores the first set of sample data in the first set of cache lines.

15. The computing device of claim 14, wherein:
the graphics subsystem further comprises:
a second screen-space pipeline coupled to the cache unit and including:
a second pixel shader configured to:
generate a second set of sample data based on a second set of primitives, and
generate a second set of resolved data based on the second set of sample data;
a second raster operations unit configured to:
store the second set of sample data in a second set of cache lines included in the cache unit, and
invalidate the second set of cache lines after the second set of resolved data is generated; and
a second pre-raster-operations unit configured to:
receive a second barrier command,
in response to receiving the second barrier command, suspend processing so that the second pixel shader is prevented from generating the second set of resolved data, and
in response to receiving the release signal, reinstate processing so that the second pixel shader is able to generate the second set of resolved data,
wherein the back-end unit is further configured to transmit the release signal to the second pre-raster-operations unit after the second raster operations unit stores the second set of sample data in the second set of cache lines.

16. The computing device of claim 15, wherein the first set of sample data is associated with a first cache tile, the first set of resolved data is associated with the first cache tile, the second set of sample data is associated with the first cache tile, and the second set of resolved data is associated with the first cache tile.

17. A computing device, comprising:
a graphics subsystem, comprising:
a cache unit;
a first screen-space pipeline coupled to the cache unit and including:
a first pixel shader configured to:
generate a first set of sample data associated with a first cache tile associated with a first set of pixels based on a first set of primitives for a second set of pixels that are offset from the first set of pixels based on a cache tile traversal direction, and
generate a first set of resolved data associated with the first cache tile based on the first set of sample data for the first set of pixels;
a first raster operations unit configured to:
store the first set of sample data in a first set of cache lines included in the cache unit, and
invalidate the first set of cache lines after the first set of resolved data is generated for a third set of pixels that are offset from the first set of pixels based on a direction opposite to the cache tile traversal direction; and a first pre-raster-operations unit configured to:
　receive a first barrier command,
　　in response to receiving the first barrier command, suspend processing so that the first pixel shader is prevented from generating the first set of resolved data, and
　　in response to receiving a release signal, reinstate processing so that the first pixel shader is able to generate the first set of resolved data; and
a second screen-space pipeline coupled to the cache unit and including:
　a second pixel shader configured to:
　　generate a second set of sample data associated with the first cache tile based on a second set of primitives, and
　　generate a second set of resolved data associated with the first cache tile based on the second set of sample data;
　a second raster operations unit configured to:
　　store the second set of sample data in a second set of cache lines included in the cache unit, and
　　invalidate the second set of cache lines after the second set of resolved data is generated; and
　a second pre-raster-operations unit configured to:
　　receive a second barrier command,
　　in response to receiving the second barrier command, suspend processing so that the second pixel shader is prevented from generating the second set of resolved data, and
　　in response to receiving the release signal, reinstate processing so that the second pixel shader is able to generate the second set of resolved data; and
　a back-end unit configured to transmit the release signal to the first pre-raster-operations unit after the first raster operations unit stores the first set of sample data in the first set of cache lines.

18. A computer-implemented method for rendering resolved data, comprising:
　generating a first set of sample data based on a first set of primitives;
　generating a first set of resolved data based on the first set of sample data;
　storing the first set of sample data in a first set of cache lines; and
　invalidating the first set of cache lines in response to the first set of resolved data being generated.

19. The computer-implemented method of claim 18, further comprising:
　receiving a first barrier command;
　in response to receiving the first barrier command, suspending processing to prevent generating the first set of resolved data;
　receiving a release signal; and
　in response to receiving the release signal, reinstating processing to generate the first set of resolved data.

20. A computer-implemented method for rendering resolved data, the computer-implemented method comprising:
　generating a first set of sample data based on a first set of primitives;
　generating a first set of resolved data based on the first set of sample data;
　storing the first set of sample data in a first set of cache lines; and
　invalidating the first set of cache lines after the first set of resolved data is generated,
　wherein the first set of resolved data is generated for a first set of pixels,
　wherein the first set of sample data is generated for a second set of pixels that are offset from the first set of pixels based on a cache tile traversal direction, and
　wherein the first set of cache lines is invalidated for a third set of pixels that are offset from the first set of pixels based on a direction opposite to the cache tile traversal direction.

* * * * *